United States Patent
Mu et al.

(10) Patent No.: US 9,103,658 B2
(45) Date of Patent: Aug. 11, 2015

(54) OPTICAL NAVIGATION MODULE WITH CAPACITIVE SENSOR

(75) Inventors: Jinghui Mu, San Jose, CA (US); Brett Alan Spurlock, Felton, CA (US); Yansun Xu, Mountain View, CA (US); John Frame, Arcadia, CA (US); KeCai Zeng, Fremont, CA (US); Brian Todoroff, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 640 days.

(21) Appl. No.: 13/248,355

(22) Filed: Sep. 29, 2011

(65) Prior Publication Data

US 2012/0320385 A1    Dec. 20, 2012

Related U.S. Application Data

(60) Provisional application No. 61/497,939, filed on Jun. 16, 2011, provisional application No. 61/502,298, filed on Jun. 28, 2011.

(51) Int. Cl.
| | |
|---|---|
| G06F 3/042 | (2006.01) |
| G01B 11/00 | (2006.01) |
| G01B 11/22 | (2006.01) |
| G06F 3/0354 | (2013.01) |

(52) U.S. Cl.
CPC .............. G01B 11/002 (2013.01); G01B 11/22 (2013.01); G06F 3/03547 (2013.01); G06F 3/0421 (2013.01)

(58) Field of Classification Search
None
See application file for complete search history.

(56) References Cited

U.S. PATENT DOCUMENTS

| | | | |
|---|---|---|---|
| 3,922,093 | A | 11/1975 | Dandliker et al. |
| 4,546,347 | A | 10/1985 | Kirsch |
| 4,799,055 | A | 1/1989 | Nestler et al. |
| 5,015,096 | A | 5/1991 | Kowalski et al. |
| 5,288,993 | A | 2/1994 | Bidiville et al. |

(Continued)

FOREIGN PATENT DOCUMENTS

| | | |
|---|---|---|
| CN | 101593785 A | 12/2009 |
| CN | 102105895 A | 6/2011 |

(Continued)

OTHER PUBLICATIONS

KIPO ISR/WO for Application No. PCT/US2011/053552 dated May 23, 2012; 10 pages.

(Continued)

*Primary Examiner* — Grant Sitta
*Assistant Examiner* — Kirk Hermann

(57) ABSTRACT

Optical navigation modules and methods of operating the same to sense relative movement between the optical navigation module and a tracking surface are provided. In one embodiment, the optical navigation module comprises: (i) a light source to illuminate at least a portion of a surface relative to which the optical navigation module is moved; (ii) an integrated circuit (IC) including a photo-detector array (PDA) to detect a light pattern propagated onto the PDA from the surface, and a signal processor to translate changes in the light pattern propagated onto the PDA into data representing motion of the optical navigation module relative to the surface; and (iii) a substrate to which the light source and IC are mounted, the substrate including an aperture in a light path between the surface and the PDA. Other embodiments are also disclosed.

17 Claims, 7 Drawing Sheets

(56) References Cited

U.S. PATENT DOCUMENTS

| | | |
|---|---|---|
| 5,473,344 A | 12/1995 | Bacon et al. |
| 5,578,813 A | 11/1996 | Allen et al. |
| 5,644,139 A | 7/1997 | Allen et al. |
| D382,550 S | 8/1997 | Kaneko et al. |
| D385,542 S | 10/1997 | Kaneko et al. |
| 5,703,356 A | 12/1997 | Bidiville et al. |
| 5,729,008 A | 3/1998 | Blalock et al. |
| 5,729,009 A | 3/1998 | Daendliker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Daendliker et al. |
| 5,933,102 A | 8/1999 | Miller et al. |
| 5,963,197 A | 10/1999 | Bacon et al. |
| 5,994,710 A | 11/1999 | Knee et al. |
| 6,031,218 A | 2/2000 | Piot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,215,417 B1 | 4/2001 | Krass et al. |
| 6,225,617 B1 | 5/2001 | Daendliker et al. |
| 6,233,368 B1 | 5/2001 | Badyal et al. |
| 6,281,881 B1 | 8/2001 | Siddiqui et al. |
| 6,281,882 B1 | 8/2001 | Gordon et al. |
| 6,300,936 B1 | 10/2001 | Braun et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,504,530 B1 | 1/2003 | Wilson et al. |
| 6,529,184 B1 | 3/2003 | Julienne |
| 6,585,158 B2 | 7/2003 | Norskog |
| 6,603,111 B2 | 8/2003 | Dietz et al. |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 6,859,196 B2 | 2/2005 | Kehlstadt |
| 7,030,860 B1 | 4/2006 | Hsu et al. |
| 7,042,575 B2 | 5/2006 | Carlisle et al. |
| 7,116,117 B2 | 10/2006 | Nakano et al. |
| 7,161,582 B2 | 1/2007 | Bathiche et al. |
| 7,199,350 B2 | 4/2007 | Chien |
| 7,221,356 B2 | 5/2007 | Oliver et al. |
| 7,274,808 B2 | 9/2007 | Baharav et al. |
| 7,295,186 B2 | 11/2007 | Brosnan |
| 7,313,255 B2 | 12/2007 | Machida et al. |
| 7,324,086 B2 | 1/2008 | Kong |
| 7,420,542 B2 | 9/2008 | Butterworth et al. |
| 7,525,082 B2 | 4/2009 | Itagaki |
| 7,557,338 B2 | 7/2009 | Gruhlke et al. |
| 7,755,348 B1 | 7/2010 | Shah et al. |
| 7,868,281 B2 | 1/2011 | Leong et al. |
| 7,977,954 B2 | 7/2011 | Reynolds et al. |
| 8,031,176 B1 | 10/2011 | Sanders et al. |
| 8,081,162 B2 | 12/2011 | Teoh et al. |
| 8,111,344 B2 | 2/2012 | Moon et al. |
| 8,400,409 B1 | 3/2013 | Francis |
| 8,416,191 B2 | 4/2013 | Gao et al. |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2004/0084610 A1 | 5/2004 | Leong et al. |
| 2004/0189593 A1 | 9/2004 | Koay |
| 2004/0208348 A1 | 10/2004 | Baharav et al. |
| 2005/0024336 A1 | 2/2005 | Xie et al. |
| 2005/0024623 A1 | 2/2005 | Xie et al. |
| 2005/0057523 A1 | 3/2005 | Moyer |
| 2005/0083303 A1 | 4/2005 | Schroeder et al. |
| 2005/0122119 A1 | 6/2005 | Barlow |
| 2005/0248534 A1 | 11/2005 | Kehlstadt |
| 2006/0048071 A1* | 3/2006 | Jarrett et al. ................ 715/784 |
| 2006/0091298 A1 | 5/2006 | Xie et al. |
| 2006/0279548 A1* | 12/2006 | Geaghan ..................... 345/173 |
| 2007/0008286 A1 | 1/2007 | Theytaz et al. |
| 2007/0052684 A1 | 3/2007 | Gruhlke et al. |
| 2007/0057157 A1 | 3/2007 | Trisnadi et al. |
| 2007/0075710 A1 | 4/2007 | Hargreaves et al. |
| 2007/0138377 A1 | 6/2007 | Zarem |
| 2007/0139381 A1 | 6/2007 | Spurlock et al. |
| 2007/0146318 A1* | 6/2007 | Juh et al. ..................... 345/157 |
| 2007/0152966 A1 | 7/2007 | Krah et al. |
| 2007/0215793 A1 | 9/2007 | Gruhlke et al. |
| 2007/0291001 A1 | 12/2007 | Trisnadi et al. |
| 2008/0006762 A1 | 1/2008 | Fadell et al. |
| 2008/0007526 A1 | 1/2008 | Xu et al. |
| 2008/0048972 A1 | 2/2008 | Kakarala |
| 2008/0061219 A1 | 3/2008 | Lee et al. |
| 2008/0094356 A1 | 4/2008 | Ording et al. |
| 2008/0158158 A1 | 7/2008 | Cheah et al. |
| 2008/0167834 A1* | 7/2008 | Herz et al. .................... 702/150 |
| 2008/0174570 A1* | 7/2008 | Jobs et al. .................... 345/173 |
| 2009/0041476 A1 | 2/2009 | Ann et al. |
| 2009/0166411 A1 | 7/2009 | Kramer et al. |
| 2009/0195503 A1 | 8/2009 | Lee et al. |
| 2009/0244026 A1 | 10/2009 | Purdy et al. |
| 2010/0013771 A1 | 1/2010 | Cheng |
| 2010/0073327 A1 | 3/2010 | Mau et al. |
| 2010/0073328 A1 | 3/2010 | Lynch et al. |
| 2010/0079411 A1 | 4/2010 | Lee et al. |
| 2010/0220900 A1 | 9/2010 | Orsley |
| 2010/0302208 A1 | 12/2010 | Brosnan et al. |
| 2010/0315337 A1 | 12/2010 | Ferren et al. |
| 2010/0315413 A1 | 12/2010 | Izadi et al. |
| 2011/0018840 A1 | 1/2011 | Fann et al. |
| 2011/0141014 A1 | 6/2011 | Liao et al. |
| 2011/0141048 A1 | 6/2011 | Brosnan et al. |
| 2011/0234539 A1 | 9/2011 | Liao et al. |
| 2011/0248961 A1* | 10/2011 | Svajda et al. ................ 345/175 |
| 2011/0310018 A1 | 12/2011 | Song et al. |
| 2011/0316790 A1 | 12/2011 | Ollila et al. |
| 2012/0002693 A1 | 1/2012 | Hasegawa et al. |
| 2012/0127076 A1 | 5/2012 | Song et al. |
| 2012/0176339 A1 | 7/2012 | Chen et al. |
| 2012/0320385 A1 | 12/2012 | Mu et al. |

FOREIGN PATENT DOCUMENTS

| | | |
|---|---|---|
| DE | 102009005092 A1 | 9/2010 |
| EP | 0404678 A | 12/1990 |
| EP | 2387744 A1 | 11/2011 |
| GB | 2400713 A | 10/2004 |
| JP | 2004318890 A | 11/2004 |
| JP | 2009031666 A | 2/2009 |
| KR | 20070008743 A | 1/2007 |
| KR | 20110051165 A | 5/2011 |
| WO | WO 2009114821 A2 * | 9/2009 |
| WO | 2010081652 A | 7/2010 |

OTHER PUBLICATIONS

"APDS-9300 Miniature Ambient Light Photo Sensor with Digital (I2C) Output", http://www.avagotech.com/docs/AV02-1077EN.

(56) References Cited

OTHER PUBLICATIONS

"Ultra-low power motion sensor for optical finger navigation and laser mice", http://www.st.com/stonline/products/literature/ds/13939.pdf.

ADNB-6011-EV and ADNB-6012-EV High Performance Laser Mouse Bundles Data Sheet, Aug. 17, 2007, Avago Technologies, 52 pages.

ADNB-6532 Small Form Factor Laser Stream Mouse Bundle Data Sheet, Nov. 10, 2006, Avago Technologies, 44 pages.

ADNK-6013 Optical Mouse Designer's Kit Design Guide, Mar. 30, 2006, Avago Technologies, 24 pages.

Angelopoulou, Elli; "The Reflectance Spectrum of Human Skin;" 1999; Department of Computer & Information Science, University of Pennsylvania; pp. 1-14.

U.S. Appl. No. 12/009,863: "Optical Navigation System Using a Single-Package Motion Sensor" Steven Sanders et al., filed on Jan. 22, 2008: 27 pages.

U.S. Appl. No. 12/218,021: "User Interface Devices, Methods, and Computer Readable Media for Sensing Movement of an Actuator Across a Surface of a Window," Mark Francis, filed on Jul. 10, 2008; 26 pages.

U.S. Appl. No. 13/231,176: Optical Navigation Module With Programmable Lift-Cut-Off) Ke-Cai Zeng et al., filed on Sep. 13, 2011; 33 pages.

U.S. Appl. No. 13/252,768: "Optical Navigation System Using a Single-Package Motion Sensor" Steven Sanders et al., filed on Oct. 4, 2011; 28 pages.

U.S. Appl. No. 13/307,350: "Hybrid Sensor Module" Yansun Xu et al., filed on Nov. 30, 2011; 31 pages.

Application No. PCT/US11/53552 "An Optical Navigation Module With Capacitive Sensor," Filed on Sep. 27, 2011; 31 pages.

International Search Report for International Application No. PCT/US2011/053552 dated Sep. 27, 2011; 5 pages.

OFN Module (#27903), http://www.zerko.ch/downloads/27903-ofnmodule-v1.0.pdf.

USPTO Advisory Action for U.S. Appl. No. 12/218,021 dated Nov. 7, 2011; 3 pages.

USPTO Advisory Action for U.S. Appl. No. 12/218,021 dated May 9, 2012; 3 pages.

USPTO Advisory Action for U.S. Appl. No. 13/231,176 dated Oct. 1, 2014; 3 pages.

USPTO Advisory Action for U.S. Appl. No. 13/231,176 dated Oct. 23, 2014; 3 pages.

USPTO Advisory Action for U.S. Appl. No. 13/231,176 dated Dec. 6, 2013; 3 pages.

USPTO Final Rejection for U.S. Appl. No. 13/231,176 dated Oct. 8, 2013; 18 pages.

USPTO Final Rejection for U.S. Appl. No. 12/218,021 dated Feb. 22, 2012; 45 pages.

USPTO Final Rejection for U.S. Appl. No. 12/218,021 dated Aug. 29, 2011; 41 pages.

USPTO Final Rejection for U.S. Appl. No. 13/231,176 dated Jul. 16, 2014; 17 pages.

USPTO Final Rejection for U.S. Appl. No. 13/252,768 dated Dec. 7, 2012; 7 pages.

USPTO Final Rejection for U.S. Appl. No. 13/307,350 dated Jan. 30, 2014; 10 pages.

USPTO Non Final rejection for U.S. Appl. No. 13/231,176 dated Mar. 26, 2014; 15 pages.

USPTO Non Final Rejection for U.S. Appl. No. 13/252,768 dated Jun. 25, 2012; 12 pages.

USPTO Non Final Rejection for U.S. Appl. No. 13/307,350 dated Aug. 23, 2013; 10 pages.

USPTO Non Final Rejection for U.S. Appl. No. 12/009,863 dated Dec. 8, 2010; 13 pages.

USPTO Non Final Rejection for U.S. Appl. No. 12/218,021 dated Apr. 27, 2011; 34 pages.

USPTO Non Final Rejection for U.S. Appl. No. 13/231,176 dated Jun. 21, 2013; 22 pages.

USPTO Notice of Allowance for U.S. Appl. No. 12/009,863 dated May 26, 2011; 5 pages.

USPTO Notice of Allowance for U.S. Appl. No. 12/218,021 dated Jan. 30, 2013; 9 pages.

USPTO Notice of Allowance for U.S. Appl. No. 12/218,021 dated Oct. 5, 2012; 9 pages.

USPTO Notice of Allowance for U.S. Appl. No. 13/252,768 dated Jan. 31, 2013; 8 pages.

USPTO Notice of Allowance for U.S. Appl. No. 13/252,768 dated May 22, 2013; 8 pages.

USPTO Notice of Allowance for U.S. Appl. No. 13/252,768 dated Sep. 6, 2013; 6 pages.

USPTO Notice of Allowance for U.S. Appl. No. 13/252,768 dated Dec. 10, 2013; 7 pages.

USPTO Notice of Allowance for U.S. Appl. No. 13/307,350 dated Apr. 11, 2014; 9 pages.

USPTO Notice of Allowance for U.S. Appl. No. 13/307,350 dated Jun. 6, 2014; 8 pages.

USPTO Notice of Allowance for U.S. Appl. No. 13/307,350 dated Oct. 2, 2014; 8 pages.

USPTO Requirement for Restriction for U.S Appl. No. 13/231,176 dated May 21, 2013; 5 pages.

Written Opinion of the International Searching Authority for International Application No. PCT/US2011/053552 dated Dec. 16, 2013; 5 pages.

* cited by examiner

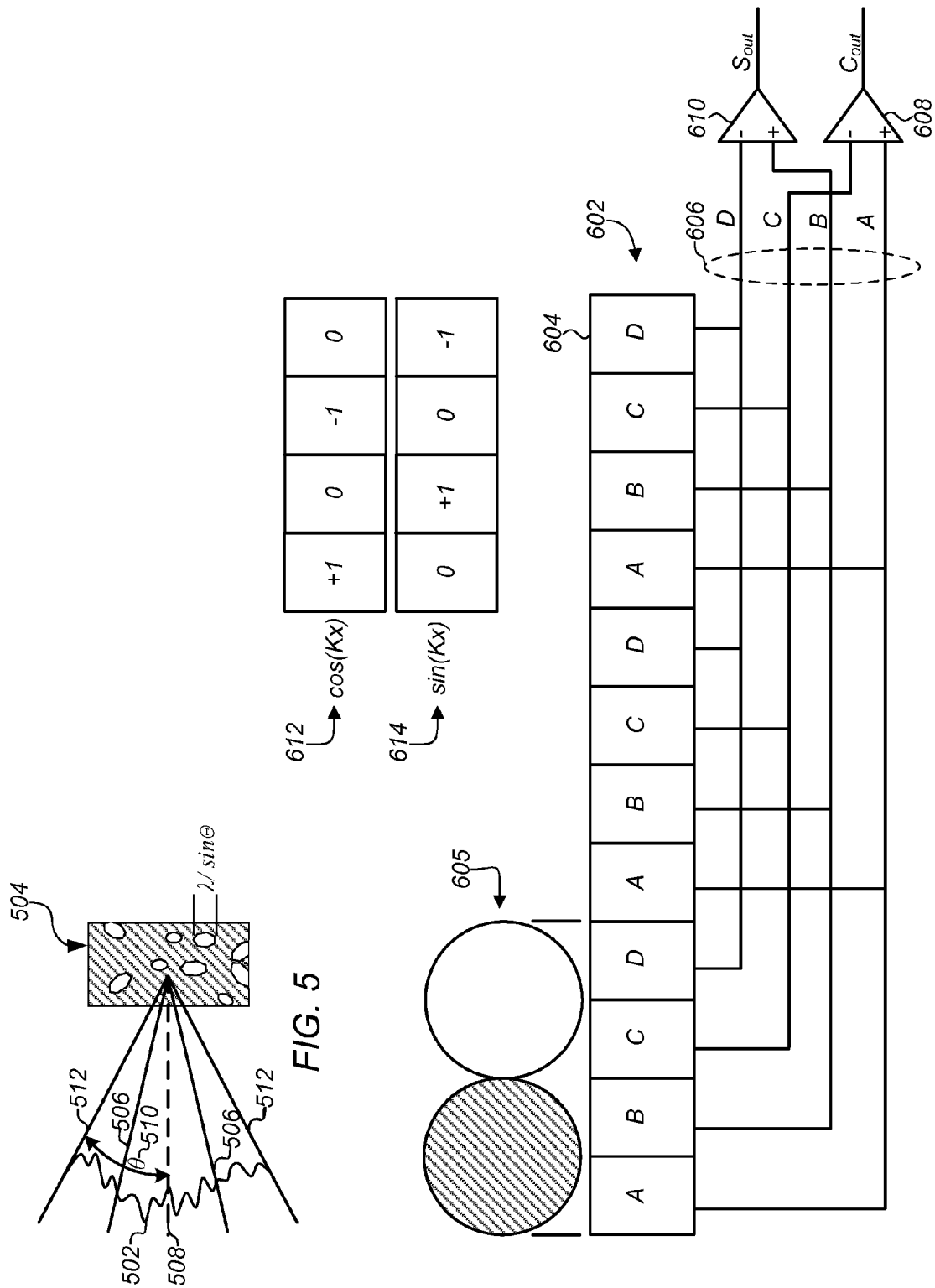

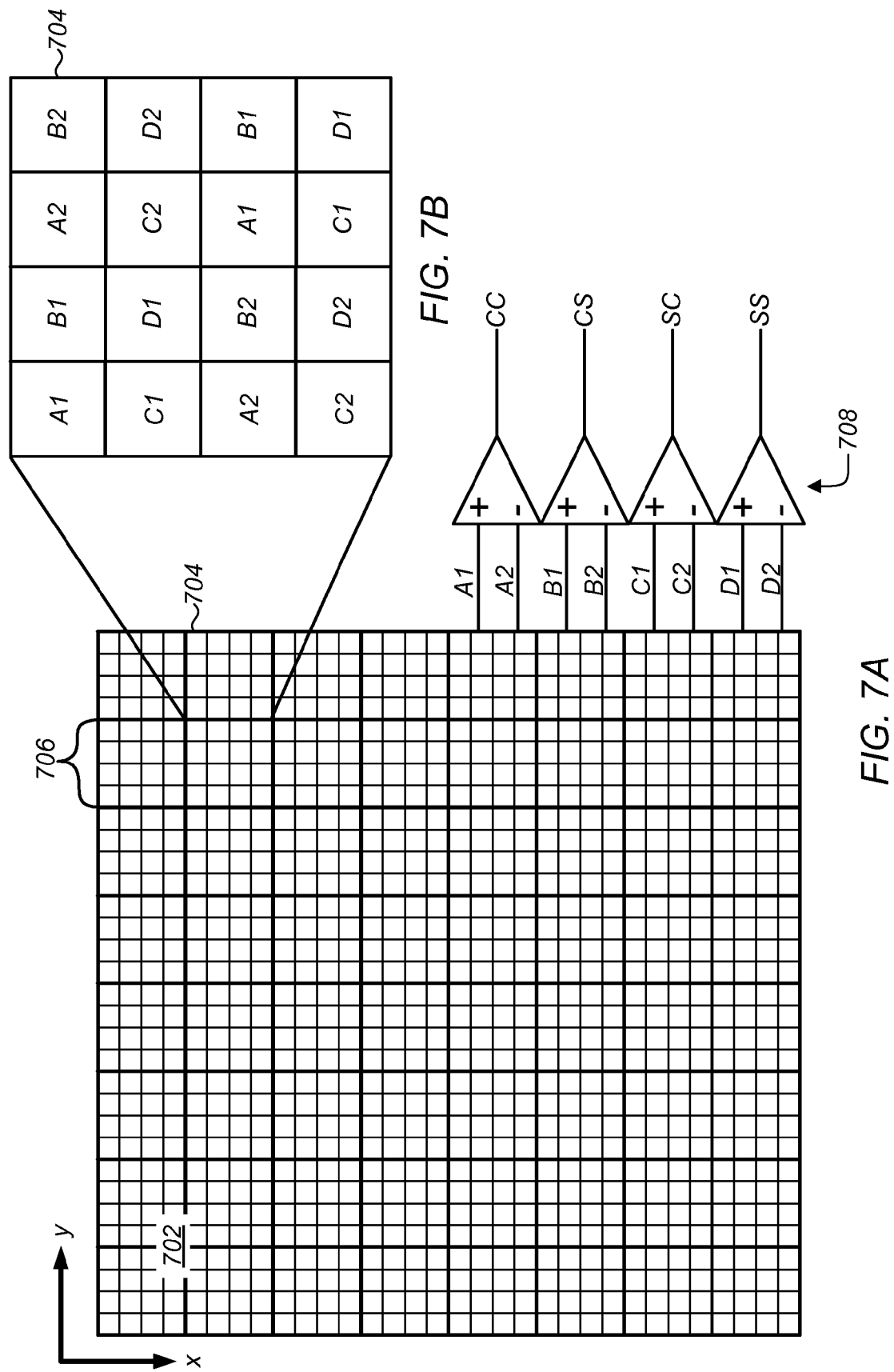

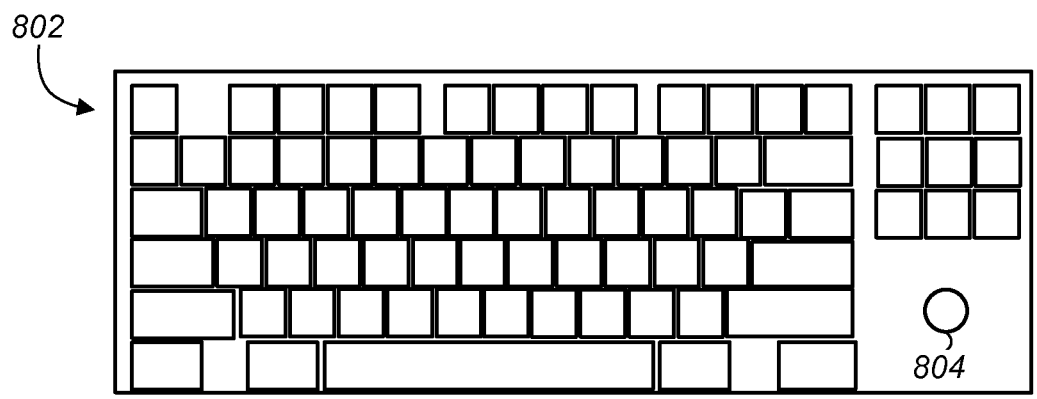
FIG. 8
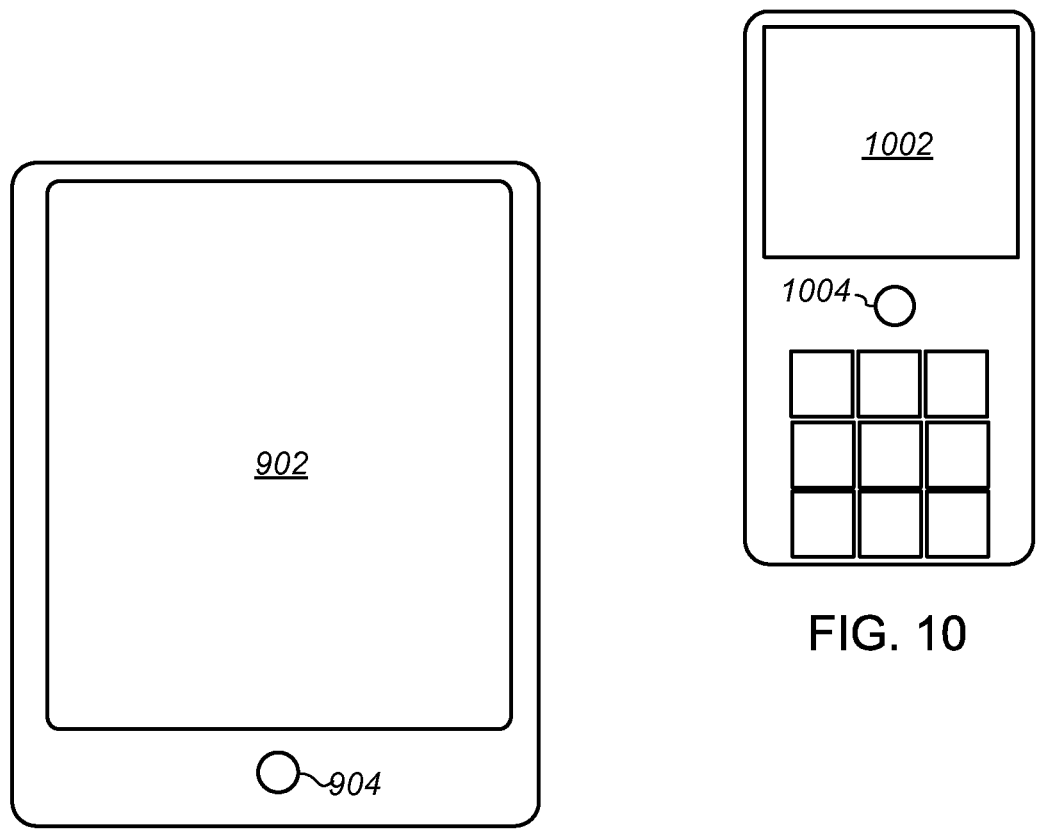
FIG. 9
FIG. 10

OPTICAL NAVIGATION MODULE WITH CAPACITIVE SENSOR

RELATED APPLICATIONS

This claims the benefit of priority under 35 U.S.C. 119(e) to U.S. Provisional Patent Application Ser. No. 61/502,298, filed Jun. 28, 2011, and to U.S. Provisional Patent Application Ser. No. 61/497,939, filed Jun. 16, 2011, both of which are incorporated by reference herein.

TECHNICAL FIELD

The present disclosure relates generally to optical navigation module, and more particularly to optical finger navigation modules and methods of operating the same.

BACKGROUND

Data processing systems, such as personal computers, tablet computers, entertainment systems, game consoles, and cellular telephones, commonly include optical navigation sensors or modules for data input and/or cursor movement. Optical navigation modules generally include a light source to illuminate a tracking surface, and a sensor, such as a charge-coupled device (CCD), complementary metal-oxide-semiconductor (CMOS) imaging array, or a comb array, to capture an image or signal in light reflected from the surface. A tracking program implemented in a signal processor coupled to the sensor analyzes successive images or samples to determine displacement of the optical navigation module relative to the surface. Because optical navigation modules work well only within a narrow range around a nominal design height separating the sensor from the tracking surface, lift-detection is necessary to detect when the optical navigation module is separated from a tracking surface by more than a maximum lift height. Previous optical navigation modules rely on an optical lift detection mechanism based on image defocus, loss of optical signal strength, or both. Although, this generally works well one problem is that each new device in which the optical navigation module is used requires a new mechanical and/or optical design and fine tuning of the optical navigation module. Also, changing the maximum lift height typically requires a new mechanical and/or optical design. Finally, the optical design to implement such a lift cutoff mechanism typically requires precision design and manufacturing processes, increasing the cost of the optical navigation module.

BRIEF DESCRIPTION OF THE DRAWINGS

These and various other features of an optical navigation module and its method of operation will be apparent upon reading of the following detailed description in conjunction with the accompanying drawings and the appended claims provided below, where:

FIG. 5 illustrates a speckle pattern in light returned from an optically rough surface;

FIG. 6 illustrates a schematic block diagram of a speckle based linear or one-dimensional (1D) comb-array for use in an OFN according to an embodiment of the present disclosure;

FIGS. 7A and 7B illustrates schematic block diagrams of a two-dimensional (2D) comb-array for use in an OFN according to an embodiment of the present disclosure;

FIG. 8 illustrates an embodiment of an OFN according to the present disclosure integrated into a keyboard of a personal computer (PC) or workstation;

FIG. 9 illustrates an embodiment of an OFN according to the present disclosure integrated into a tablet PC; and FIG. 10 illustrates an embodiment of an OFN according to the present disclosure integrated into a cellular telephone or handheld electronic device.

DETAILED DESCRIPTION

Figure 1A:
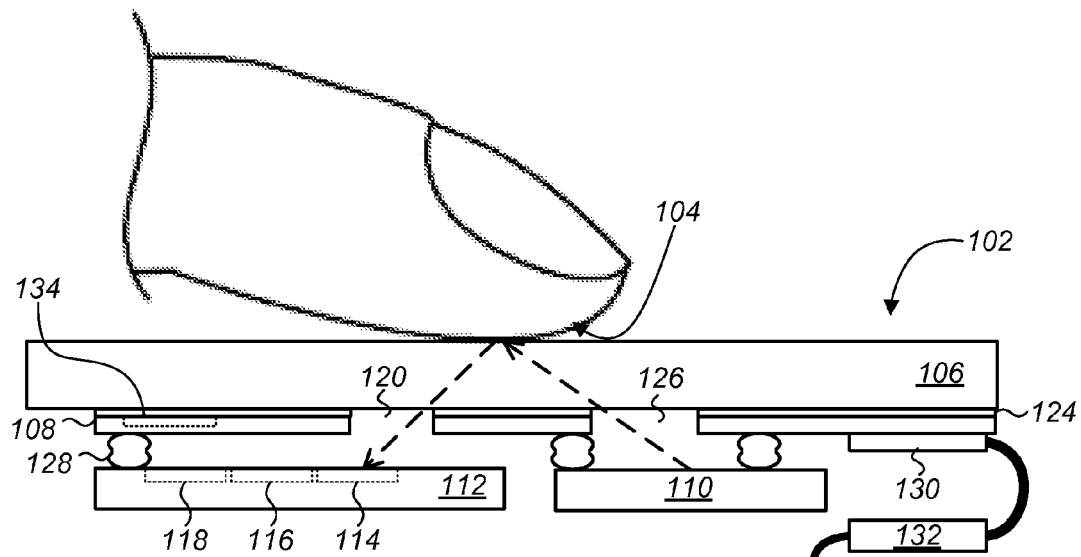
FIG. 1A illustrates a block diagram of an embodiment of an optical finger navigation (OFN) module with a capacitive sensor and aperture in a substrate attached to a window.

Optical navigation modules and methods are provided for use in an input device to sense relative movement between the optical navigation module and a tracking surface. In one embodiment, the optical navigation module comprises: (i) a light source to illuminate at least a portion of a surface relative to which the optical navigation module is moved; (ii) an integrated circuit (IC) including a photo-detector array (PDA) to detect a light pattern propagated onto the PDA from the surface, and a signal processor to translate changes in the light pattern propagated onto the PDA into data representing motion of the optical navigation module relative to the surface; and (iii) a substrate to which the light source and IC are mounted, the substrate including an aperture in a light path between the surface and the PDA.

In another embodiment, the optical navigation module is an optical finger navigation (OFN) module and comprises a capacitive sensor to detect a lift height separating a surface of the finger or other surface from the OFN module and to cut-off or to interrupt data representing motion of the optical navigation module relative to the surface when the lift height exceeds a maximum lift height. Alternatively, the capacitive sensor is configured to switch the OFN module from a first mode of operation in which motion of the finger is tracked to a second mode of operation in which an optical sensor in the OFN module operates as an ambient light detector.

The drawings described are only schematic and are non-limiting. In the drawings, the size of some of the elements may be exaggerated and not drawn to scale for illustrative purposes. The dimensions and the relative dimensions may not correspond to actual reductions to practice of the invention. For purposes of clarity, many details of input devices and methods of operation in general, and buttons, keys and optical navigation sensors in particular, which are widely known and not relevant to the present apparatus and method have been omitted from the following description.

In one embodiment, shown in FIG. 1A, the optical navigation module comprises an optical finger navigation (OFN) module 102 for sensing relative movement of a tracking surface 104 (such as the surface of a finger, a stylus, a palm, or other suitable object) over an optically transparent window 106 of the OFN module. The OFN module 102 may detect gestures, such as tapping or double tapping the window 106, as well as elative movement between the tracking surface and the OFN module.

Referring to FIG. 1A, the OFN module 102 includes a substrate 108, such as a circuit board or printed circuit board (PCB) to which an illuminator or light source 110, such as a light emitting diode (LED), a laser or VCSEL, and a sensor integrated circuit (IC 112) are mounted. Components of the IC 112 include a photo-detector or photo-detector array (PDA 114), such as an array of photodiodes, front-end electronics 116, such as analog amplifiers, differential amplifiers and comparators, and signal processing circuitry or a signal processor 118 for translating changes in a light pattern propagated onto the PDA from the tracking surface 104 into motion data. By propagated it is meant the transmission or movement of light from the tracking surface 104 onto the PDA 114 as the result of either scattering or reflection of light from the tracking surface.

The substrate 108 further includes a first opening or aperture 120 in a light path 122 between the tracking surface 104 and the PDA 114 for controlling the light scattered onto the PDA and blocking environmental light. In some embodiments, such as that shown, in which an upper surface of the substrate 108 is affixed to a lower surface of the window 106, for example by an adhesive 124, and the light source 110 and IC 112 flip-chip mounted to a back or lower surface of the substrate, the substrate further includes a second opening 126 over the light source in the assembled OFN module 102. By flip-chip mounted it is meant the light source 110 and IC 112 are mounted and electrically coupled to a metal layer or conductive traces on the substrate 108 by solder bumps 128 deposited on pads (not shown) on the light source and IC so that the top or electronically active sides of the light source and IC face the substrate. This is in contrast to wire-bonded configurations, in which chips are mounted facing away from a circuit board or substrate and wires are used to interconnect pads to external circuitry. Optionally, the substrate 108 further includes a connector 130, such as a ribbon connector, on the lower surface through which the light source 110 and/or IC 112 are electrically coupled to a controller 132 and/or input device with which the OFN module 102 is used.

Additionally, the substrate 108 may further include mounted thereon or embedded therein a capacitive sensor 134 to detect the presence or absence of a tracking surface 104 or finger. In one embodiment, shown in FIG. 1B, the capacitive sensor 134 can be a mutual capacitive sensor including a number of adjacent plate segments or electrodes 136a and 136b formed from a number of patterned conductive or metallic layers on the top surface the substrate 108, and circuitry in the IC 112 or controller 132 configured to detect capacitance between the electrodes.

Figure 1B:
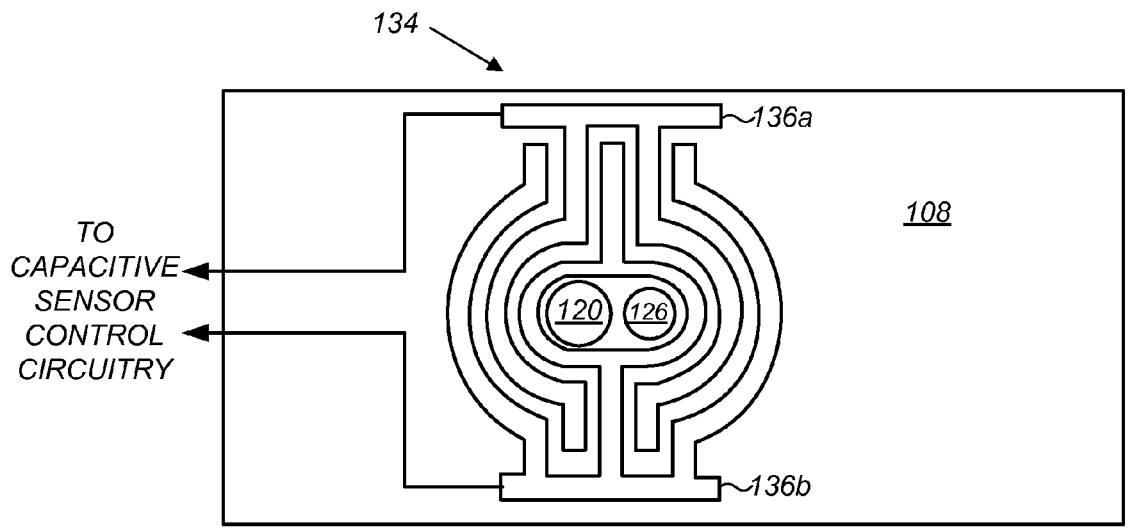
FIG. 1B illustrates a top view of the substrate of FIG. 1A.
Figure 1C:
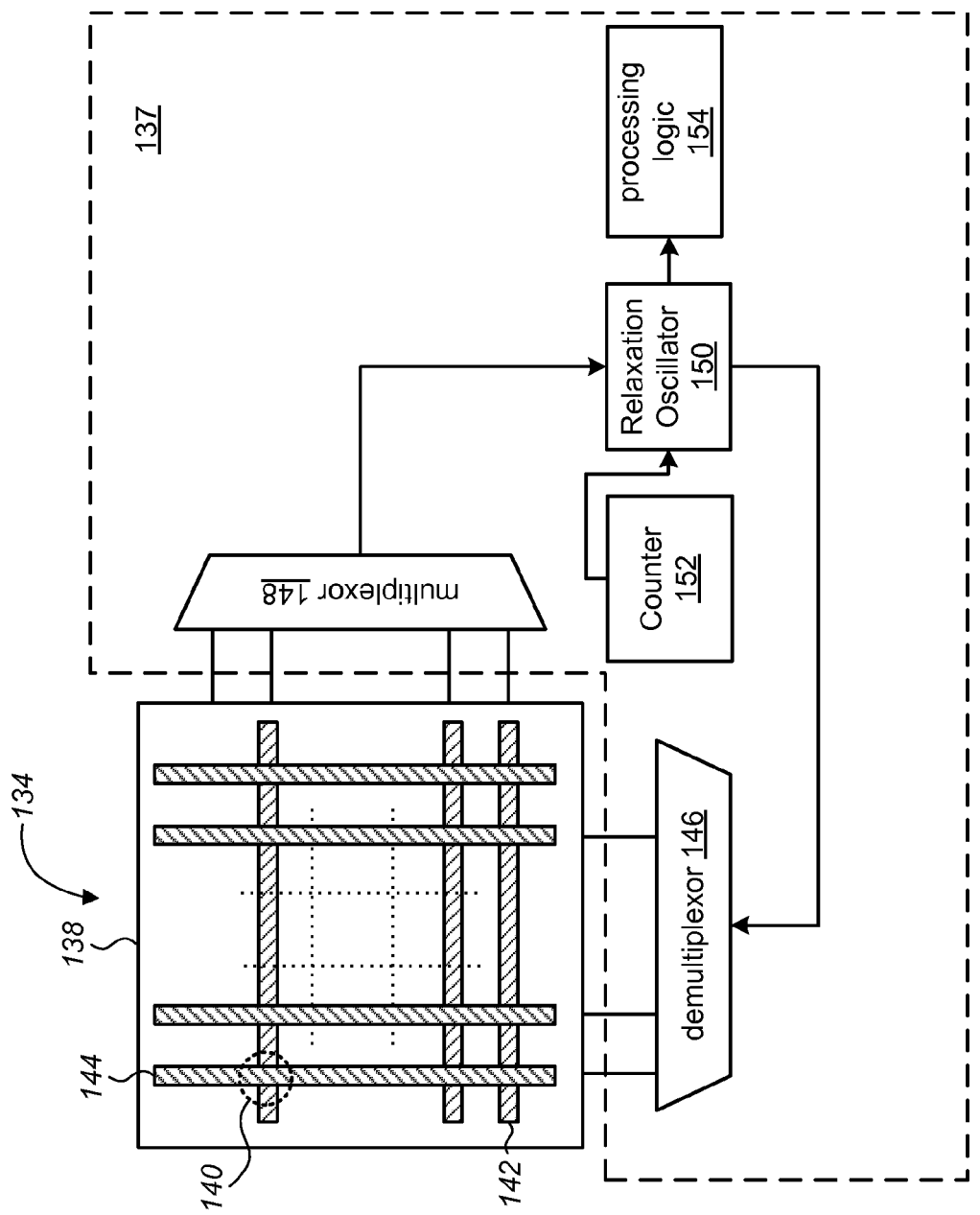
FIG. 1C illustrates a block diagram of an embodiment of the capacitive sensor of FIG. 1A with a controller.

In another embodiment, shown in FIG. 1C, the capacitive sensor 134 can include a matrix or array 138 of sensor elements 140, each formed from an intersection of one of a number of receive electrodes 142 and transmit electrodes 144. The sensor array 138 is coupled to capacitive sensor control circuitry 137 through a transmit demultiplexer 146 and receive multiplexer 148. As noted above, the capacitive sensor control circuitry 137 can be embodied in the IC 112 or in the controller 132 for the OFN module 102. In some embodiments, such as that shown in FIG. 1C, the capacitive sensor control circuitry 137 may include a relaxation oscillator 150 or other means to convert a capacitance into a measured value, a counter 152 or timer to measure the oscillator output, and processing logic 154 implemented in firmware, hardware or software to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. Although shown as part of the controller 132, it will be understood that any or all of the transmit demultiplexer 146, receive multiplexer 148, relaxation oscillator 150, counter 152 or processing logic 154 can alternatively be implemented on the substrate 108 with the capacitive sensor 134 or in the IC 112.

Alternatively, the capacitive sensor 134 can be a self-capacitive or an absolute capacitive sensor detecting capacitance between a single continuous top plate or electrode (not shown) on the top surface the substrate 108 and a ground plane (not shown) on the lower surface of the substrate, or in the IC 112.

In one embodiment, the controller 132 is a programmable controller, such as a Programmable System On a Chip or PSoC™ controller, commercially available from Cypress Semiconductor of San Jose, Calif., and includes a program resident therein capable of operating the OFN module in two or more modes of operation. For example, in a first mode of operation when the capacitive sensor 134 detects the presence of a tracking surface 104 or finger within a lift height less than a maximum lift height, the value of which is stored in a register or memory in the controller 132, the controller operates the OFN module 102 to track motion of the tracking surface relative to the OFN module.

In a second mode of operation when the capacitive sensor 134 does not detect the presence of a tracking surface 104 within a lift height less than the maximum lift height, or detects the absence of the tracking surface, the controller 132 can operate the OFN module 102 to interrupt output of motion data from the OFN module 102, thereby preventing the output of erroneous motion data from the OFN module caused by the tracking surface or finger exceeding the maximum tracking height, or a changing pattern of environmental or ambient light passing through the exposed window 106 and aperture 120 onto the PDA 114. Interrupting output of motion data from the OFN module 102, can be accomplished by removing electrical power from the light source 110, the PDA 114, front-end electronics 116 and/or signal processor 118, or by switching or re-configuring the signal processor to interrupt output of motion data. Removing electrical power from the components of the OFN module 102, other than those needed for operating the capacitive sensor 134, when operating in the second mode, provides the further advantage of reducing power consumption in battery operated devices using the OFN module.

Alternatively or additionally the capacitive sensor 134, can be configured or adapted to sense gestures, such as tapping or double tapping a surface of the OFN module 102, or sweeping the tracking surface 104 or finger across the surface of the OFN module in a particular direction, as well as the presence or absence of the tracking surface or finger. The gestures are sensed by the capacitive sensor 134 through sensing rapid or sudden changes in capacitance over a prescribed period of time, i.e., tapping or double tapping, or by sensing a change in capacitance between electrodes 136 or separate capacitive elements across the surface of the substrate 108.

After disabling surface tracking the second mode of operation can further include operating the OFN module 102 as an ambient light sensor to measure and output data representing ambient light impinging on the PDA 114. Such ambient light data can be used, for example, to adjust the brightness or hue of a display in a device, such as a computer, electronic reader or cellular telephone, utilizing or incorporating the OFN module.

In yet another or third mode of operation when the capacitive sensor 134 detects the presence of a tracking surface 104 within a lift height less than the maximum lift height, but the OFN module 102 does not detect movement of the tracking surface after a programmed period of time, the controller 132 can include a program to operate the OFN module to enable an auto scrolling function, which a data output representing a previous motion is continued until the tracking surface is lifted or moved again.

Optionally, the controller 132 can include a program to enable a user to specify the maximum lift height, or select from among one of a number of pre-programmed maximum lift heights stored in the controller. Because the OFN module 102 can satisfactorily track different fingers at different lift heights due to variations in surface roughness and/or pigmentation, in one version of this embodiment, the user can select from among the pre-programmed maximum lift heights by specifying a finger type. Alternatively, the controller 132 can include a program to enable a user to specify the maximum lift height through a calibration procedure in which the finger is moved towards or lifted from the surface of the window 106.

FIG. 1B illustrates a top view of the substrate 108 of the OFN module 102 of FIG. 1A. Referring to FIG. 1B the substrate 108 includes one or more layers of material substantially opaque to at least one wavelength of light generated by the light source and sensed by the PDA, and the first opening or aperture 120, which at least partially overlies the PDA 114 in the assembled OFN module 102, and the second opening 126 over the light source 110. The capacitive sensor 134 includes one or more layers of a metal or other conductive material formed on or laminated to the substrate 108 and patterned using standard lithographic techniques to form one or more plates or electrodes of the capacitive sensor. As noted above, the capacitive sensor 134 can be a mutual capacitive sensor including a number of adjacent plate segments or electrodes 136 on the top surface the substrate 108, and detecting capacitance between the electrodes.

Figure 2:
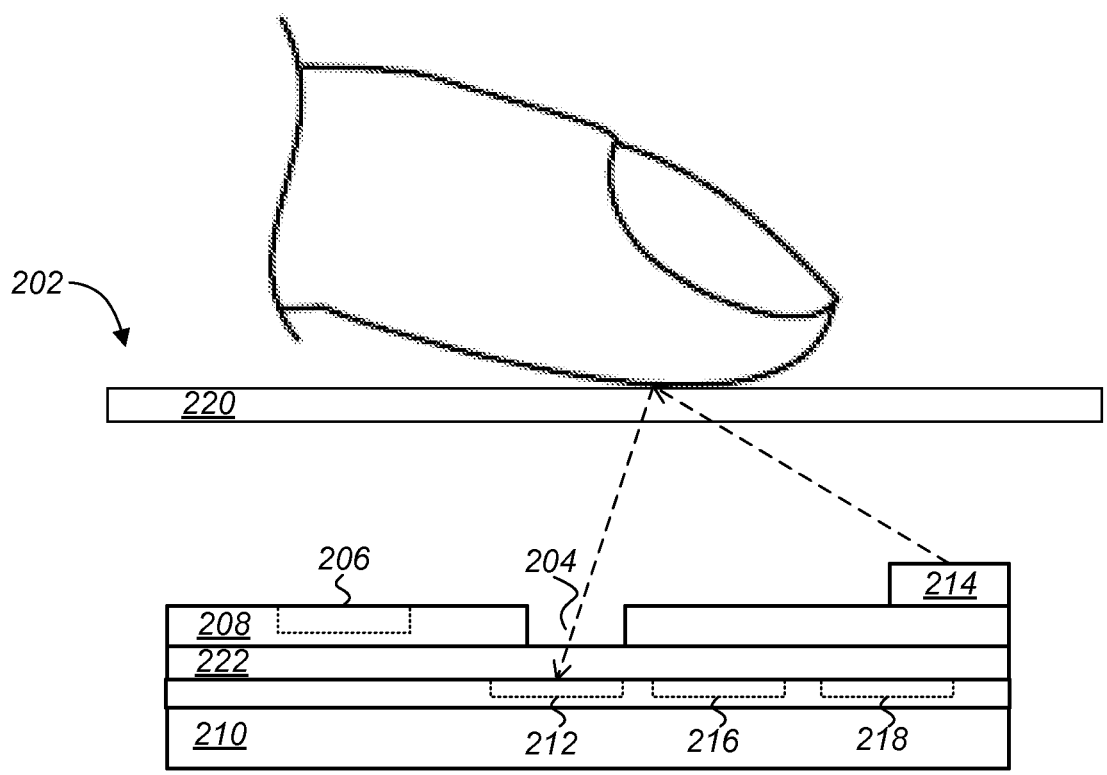
FIG. 2 illustrates a block diagram of another embodiment of an OFN module with a capacitive sensor and aperture in a substrate formed on or attached to an integrated circuit over a photo-detector array (PDA)

In another embodiment, shown in FIG. 2, the OFN module 202 includes an aperture 204 and capacitive sensor 206 in or on a substrate 208 formed on or attached to an integrated circuit (IC 210) including a photo-detector array (PDA 212) over the PDA, and a light source 214. Generally, the IC 210 further includes front-end electronics 216 and/or a signal processor 218 as described above with respect to the OFN module 102, and a window 220 separating the IC from a finger to be tracked by the OFN module 202. In addition, the IC 210 can further include one or more layers 222 between the substrate 208 and the IC 210, and adjusting a height separating the aperture 204 from the PDA 212. The layer or layers 222 can include an optically transparent material in a light path between the finger and the PDA 212 or an opening (not shown) overlying the PDA.

The substrate 208 can include one or more layers of conductive or dielectric material formed, deposited or grown on the IC 210 using standard semiconductor processing techniques prior to dicing the IC from a semiconductor wafer, or one or more layers of conductive or dielectric material fabricated separately and affixed to the IC. In one embodiment, the substrate 208 includes a conductive or metal layer deposited over a dielectric layer, and patterned using standard photolithographic techniques to form of a plate of an absolute capacitance sensing system, or electrodes of a mutual capacitance sensing system where the finger alters the mutual coupling between adjacent electrodes or plate segments.

In another embodiment, the light source 214 of the OFN module is affixed to the substrate 208 on a side opposite the IC 210. Optionally, the light source 214 can be electrically coupled to a power supply through the patterned metal layer on the substrate 208.

Figure 3:
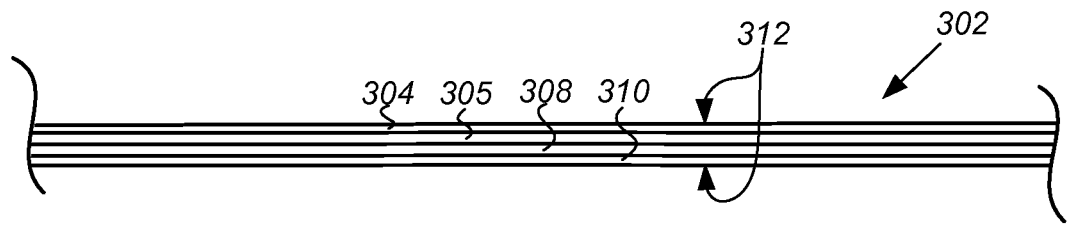
FIG. 3 illustrates an embodiment of a sectional view of a portion of a window for use with the OFNs of FIGS. 1A and 2.

A cross-sectional side view of a portion of the window for use with the OFNs of FIGS. 1A and 2 is shown in FIG. 3. Referring to the embodiment of FIG. 3, the window 302 can include one or more layers 304, 306, 308, 310, of plastic, glassine or crystalline materials that are substantially transparent to at least one wavelength of light, which can be emitted by the light source and sensed by the detector. In addition, the window 302 should be of a good optical quality so that it does not disperse light passing through. Outer and/or inner layers 304, 310, of the window 302 can be selected for physical or optical properties, such as abrasion resistance, strength and/or low reflection. Low reflection may be achieved through the use of an additional anti-reflective coatings (ARC), layers or surfaces 312.

In one embodiment the window 302 has at least two filtering layers 306, 308, including a first filter layer to block light having wavelengths shorter than the wavelength of the light source, and a second filter to block light having wavelengths longer than the wavelength of the light source.

Figure 4:
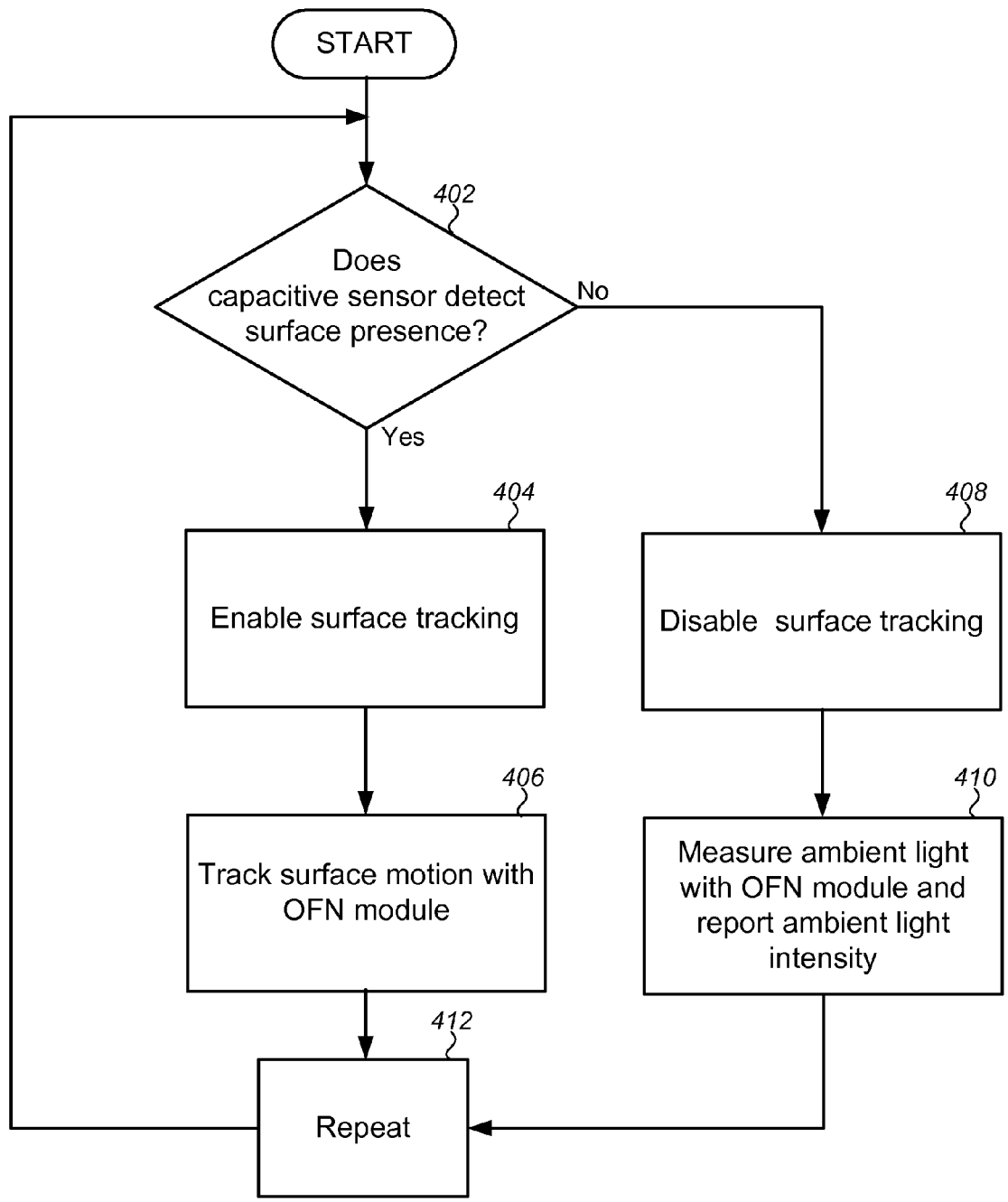
FIG. 4 is a flow chart of an embodiment of a method for operating an OFN module with a capacitive sensor.

Embodiments of methods for operating an OFN module with a capacitive sensor and capable of operating in two modes of operation will now be described with reference to the flowchart of FIG. 4.

In a first block, the OFN module detects with a capacitive sensor affixed to or embedded in a substrate, such as a circuit board, of the OFN module the presence of a tracking surface in proximity to the OFN module (402). As explained above with respect to the OFNs of FIGS. 1A and 2, detecting the surface presence can include measuring with the capacitive sensor a lift height separating the surface from the OFN module and comparing the measured lift height to a maximum lift height programmed or stored in firmware of the OFN module or a capacitive sensor controller. Next, if the presence of a surface is detected, surface tracking is enabled (404) and the OFN module operated in a first mode to track motion of the surface with an optical sensor of the OFN module (406). Enabling surface tracking may be accomplished by applying electrical power to the light source, front end electronics and/or signal processor, or by switching or re-configuring the signal processor to output data representing motion of the OFN module relative to the surface. Tracking motion of the surface generally includes illuminating at least a portion of a surface with the light source; detecting a pattern in light scattered from the surface onto a PDA on a sensor IC in the OFN module; and translating with the signal processor changes in the pattern of light scattered onto the PDA into data representing motion of the optical navigation module relative to the surface. In one embodiment, where the light source and IC are mounted to a substrate including an aperture, and detecting the pattern in light scattered from the surface onto the PDA includes detecting the pattern in light scattered from the surface from through the aperture and onto the PDA.

If the presence of a surface is not detected, surface tracking is disabled (408). Disabling surface tracking may be accomplished by removing electrical power from the light source, front end electronics and/or signal processor, or by switching or re-configuring the signal processor to interrupt output of data representing motion of the OFN module relative to the surface. Optionally, after disabling surface tracking the method can further include operating the OFN module in a second mode to detect and output data representing ambient light impinging on the PDA (410). As noted above, data on ambient light can be used by the device in which the OFN module is included or used with to, for example, adjust light output of a display.

Finally, the method is repeated (412) beginning with detecting the presence of a tracking surface in proximity to the OFN module (402). The method can be repeated by sampling or polling the capacitive sensor at regular scheduled intervals, or by continuously monitoring output of the capacitive sensor for a change in output therefrom.

Operating principles of a speckle-based OFN will now be described with reference to FIG. 5. For purposes of clarity, many of the details of speckle-based ONS, which are widely known and not relevant to the present invention, have been omitted from the following description.

Referring to FIG. 5, any general surface with morphological irregularities of dimensions greater than the wavelength of the incident light (i.e. roughly >1 μm) will tend to scatter light 502 into a complete hemisphere in approximately a Lambertian fashion. If a coherent light source, such as a laser is used, the spatially coherent light returned from the surface will create a complex interference pattern upon detection by a square-law detector with finite aperture. This complex interference pattern of light and dark areas is referred to as speckle or a speckle pattern 504. As shown in FIG. 5, the contribution for the measured speckle pattern 504 comes from rays 506 between the surface normal 508 and the extreme rays 512. Speckle is the random interference pattern generated by scattering of coherent light off a rough surface and detected by an intensity photosensitive element, such as a photodiode, with a finite angular field-of-view or numerical aperture (NA). The detailed nature of the speckle pattern depends on the surface topography, and the wavelength of light scattered therefrom. A translational speckle pattern resulted from a moving rough surface can be employed to identify any relative motion between the ONS and the surface as it is displaced transversely to the ONS.

A speckle sensitive photo-detector array can include one or more linear or one-dimensional (1D) or a two-dimensional (2D) comb-array having multiple detectors or photosensitive elements arranged in a two-dimensional configuration.

A linear or 1D comb-array is an array having multiple photosensitive elements that are connected in a periodic manner, so the array acts as a fixed template that integrates one spatial frequency component of the signal. An embodiment of one such 1D comb-array is shown in FIG. 6. The connection of multiple photosensitive elements in a periodic manner enables the comb-array to serve effectively as a correlator at one spatial frequency K (defined by a pitch of the photosensitive elements in the array and the collection optics). FIG. 4 shows a general configuration (along one axis) of a 1D comb-array 602 of photosensitive elements, such as photodiodes 604, wherein the combination of interlaced groups of photosensitive elements serves as a periodic filter on spatial frequencies of light-dark signals 605 produced by the speckle (or non-speckle) images. In the embodiment shown, the 1D comb-array 602 consists of a number of photodiode sets or periods, each having four of photodiodes 604, labeled here as A, B, C, and D. Currents or signals from corresponding or similarly labeled photodiodes 604 in each period are electrically connected (wired sum) to form four line signals 606 coming out from the array 602. Background suppression and signal accentuation is accomplished by using first differential analog circuitry 608 to generate an in-phase differential current signal, labeled here as $C_{out}$, and second differential analog circuitry 610 to generate a quadrature differential current signal, labeled here as $S_{out}$. Comparing the phase of the in-phase and quadrature signals permits determination of the magnitude and direction of motion of the 1D comb-array 602 relative to a scattering surface.

Referring to FIG. 6, the in-phase $C_{out}$ and the quadrature $S_{out}$ signals are obtained by taking the underlying speckle pattern and processing them according to the cosine and sine templates, 612 and 614 respectively. The ONS may be designed so that an optical "light-dark" signal pattern, i.e., speckle, has a size substantially equal to the period of the comb-array—four (4) photodiodes 604 or pixels in the embodiment of FIG. 6. The in-phase signal current is obtained from $C_{out}$=A−C, and the quadrature signal current from $S_{out}$=B−D as shown in FIG. 6.

In one embodiment the photo-detector array includes photodiodes or photosensitive elements are arranged in two dimensions (2D), as shown in FIGS. 7A and 7B. The performance of the 2D comb-array is expected to be superior to the 1D×1D case since each point in the image, in the average, traverses a much longer path inside the 2D detector active area in all directions and therefore contributes more to the displacement estimation. FIGS. 7A and 7B are schematic block diagrams of a 2D comb-array having photosensitive elements grouped in a 4×4 elements-per-cell configuration. Referring to FIGS. 7A and 7B, the 2D comb-array 702 may have multiple photosensitive elements 704 arranged or grouped into cells 706, each cell having photosensitive elements grouped in a 4×4 elements-per-cell (or 4×4 elements/period) configuration. Photosensitive elements 704 within a cell 706 with the same letter and same number, as shown in the detail of FIG. 5B, as well as corresponding elements of all cells in the 2D comb-array 702 with the same number, are electrically connected or wired-sum to yield eight signals A1 through D2. The eight wired-sum signals are further combined with differential amplifiers 708 to provide four signals containing the in-phase and quadrature information in the x and y directions.

In one embodiment, shown in FIG. 8, the OFN module may be integrated into a case or keyboard 802 of a personal computer (PC) or notebook computer. The OFN module generally includes an opening or optically transparent window 804 in or through a surface of the keyboard 802 through which the OFN module, senses relative movement and or gestures of a tracking surface, such as a finger, a stylus, a palm, or other suitable object. Optionally, the OFN module may further include a capacitive sensor and to detect a lift height separating a surface of the finger from the OFN module, and a program embedded in firmware to switch the OFN module from a first mode of operation in which motion of the finger is tracked to a second mode of operation in which motion of the finger is not tracked and an optical sensor in the OFN operates as an ambient light detector.

In another embodiment, shown in FIG. 9, the OFN module is housed within and used with a digital reader or tablet computer 902. Referring to FIG. 9 in this embodiment the OFN module is located or housed beneath an opening or optically transparent window 904 in or through a surface of the tablet computer 902 through which the OFN module, senses relative movement and or gestures of a tracking surface, such as a finger, palm, or stylus. As described above, the OFN module may further include a capacitive sensor and to detect a lift height separating a surface of the finger from the OFN module, and a program embedded in firmware to switch the OFN module from a first mode of operation in which motion of the finger is tracked to a second mode of operation in which motion of the finger is not tracked and an optical sensor in the OFN operates as an ambient light detector.

In still another embodiment, shown in FIG. 10, the OFN module is housed within and used with a mobile or handheld electronic device 1002, such as cellular telephone, a game controller, remote pointing device or personal digital assistant (PDA). Referring to FIG. 10 in this embodiment the OFN module generally includes an optically transparent window 1004 in or through a surface of the handheld electronic device 1002 through which movement between the OFN module and an object, i.e., a finger, on or proximal to the window is sensed. As described above, the OFN module may further include a capacitive sensor and to detect a lift height separating a surface of the finger from the OFN module, and a program embedded in firmware to switch the OFN module from a first mode of operation in which motion of the finger is tracked to a second mode of operation in which motion of the finger is not tracked and an optical sensor in the OFN operates as an ambient light detector.

Thus, embodiments of an optical navigation module and methods for operating the same have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the optical navigation module and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. An optical navigation module comprising:
   a light source to illuminate at least a portion of a surface of a finger relative to which the optical navigation module is moved;
   an integrated circuit (IC) including a photo-detector array (PDA) to detect a light pattern propagated onto the PDA from the surface of the finger, and a signal processor to translate changes in the light pattern propagated onto the PDA into data representing motion of the optical navigation module relative to the surface of the finger;
   a circuit board to which the light source and IC are mounted, the circuit board including an aperture in a light path between the surface of the finger and the PDA;
   a capacitive sensor on the circuit board configured to detect a lift height between the surface of the finger and the optical navigation module, the IC and PDA are further configured to detect ambient light when the lift height exceeds a maximum lift height; and
   a controller electrically coupled to the capacitive sensor, IC and PDA configured to switch from a first mode of operation interrupting data representing motion of the optical navigation module relative to the surface, to a second mode of operation and enabling measuring and reporting of ambient light by the IC and PDA when the lift height exceeds a maximum lift height.

2. The optical navigation module of claim 1 wherein the IC is flip-chip mounted to the circuit board by solder between pads on the IC and the circuit board.

3. The optical navigation module of claim 2, wherein the controller is programmable to specify the maximum lift height.

4. The optical navigation module of claim 3 further comprising a window including a first surface over which the surface of the finger is moved and a second surface to which the circuit board is affixed to the window and wherein the window is in the light path between the surface of the finger and the PDA.

5. The optical navigation module of claim 4 wherein the light source is flip-chip mounted to the circuit board on a common side with the IC and opposite the window, and wherein the light source illuminates the surface relative to which the optical navigation module is moved through an opening in a light path between the light source and the surface.

6. An input device comprising the optical navigation module of claim 4, wherein the input device is configured to be used with a personal computer (PC), a tablet PC or a handheld electronic device.

7. The optical navigation module of claim 1 wherein the optical navigation module does not include an optically active element in the light path between the surface and the PDA.

8. A method of operating an optical navigation module comprising:
   illuminating with a light source in the optical navigation module at least a portion of a surface relative to which the optical navigation module is moved;
   detecting a pattern in light propagated from the surface onto a photo-detector array (PDA) in an integrated circuit (IC) of the optical navigation module; and
   translating with a signal processor in the IC changes in a pattern of light propagated onto the PDA into data representing motion of the optical navigation module relative to the surface,
   wherein the light source and IC are mounted to a circuit board including an aperture, and wherein detecting the pattern in light propagated from the surface onto the PDA comprises detecting the pattern in light propagated from the surface from through the aperture and onto the PDA, wherein the surface comprises a surface of a finger, and further comprising detecting with a capacitive sensor on the circuit board a lift height between the surface of the finger and the optical navigation module, and when the surface of the finger is detected by the capacitive sensor, and motion between the surface of the finger and the optical navigation module is not, enabling auto scrolling in which previous data representing motion of the optical navigation module relative to the surface is continued until the surface of a finger is lifted or motion between the surface of the finger and the optical navigation module is again detected.

9. The method of claim 8 wherein optical navigation further comprises a controller electrically coupled to the capacitive sensor, and further comprising a controller function of interrupting data representing motion of the optical navigation module relative to the surface when the lift height exceeds a maximum lift height.

10. The method of claim 9 further comprising prior to interrupting data representing motion of the optical navigation module relative to the surface, the method of programming the controller to specify the maximum lift height.

11. The method of claim 9 further comprising after interrupting data representing motion of the optical navigation module relative to the surface, the method of detecting with the IC and PDA ambient light impinging on the PDA.

12. An optical navigation module comprising:
a light source to illuminate at least a portion of a surface relative to which the optical navigation module is moved; and
an integrated circuit (IC) including a photo-detector array (PDA) to detect a light pattern propagated onto the PDA from the surface;
a signal processor to translate changes in the light pattern propagated onto the PDA into data representing motion of the optical navigation module relative to the surface;
a substrate overlying and affixed to the IC, wherein the substrate comprises an optically opaque material and is patterned to form an aperture in a light path between the surface and the PDA;
a capacitive sensor configured to detect a lift height between the surface and the optical navigation module; and
a controller electrically coupled to the capacitive sensor and IC, the controller programmable to specify a maximum lift height at which the optical navigation module can track due to variations in roughness or pigmentation of the surface.

13. The optical navigation module of claim 12 wherein the IC further comprises a dielectric layer separating the PDA from the substrate, and wherein the substrate comprises a conductive layer patterned to form elements of the capacitive sensor.

14. The optical navigation module of claim 12 wherein the light source is affixed to a surface of the substrate opposite the IC.

15. The optical navigation module of claim 12 wherein the optical navigation module does not include an optically active element in the light path between the surface and the PDA.

16. The optical navigation module of claim 12 wherein the surface comprises a surface of a finger, and wherein the controller includes a program to enable a user to specify the maximum lift height through a calibration procedure in which the finger is moved towards or away from the optical navigation module.

17. The optical navigation module of claim 12 wherein the surface comprises a surface of a finger, and wherein the controller is programmable to specify the maximum lift height by enabling a user to select from among the pre-programmed maximum lift heights by specifying roughness or pigmentation of the surface.

* * * * *